United States Patent
Griffin et al.

(10) Patent No.: US 9,365,294 B2
(45) Date of Patent: Jun. 14, 2016

(54) HELICOPTER TRANSMISSION MOUNT SYSTEM

(71) Applicant: Bell Helicopter Textron Inc., Fort Worth, TX (US)

(72) Inventors: Maurice D. Griffin, Euless, TX (US); Matthew W. Hendricks, Grand Prairie, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 285 days.

(21) Appl. No.: 14/086,372

(22) Filed: Nov. 21, 2013

(65) Prior Publication Data

US 2015/0136900 A1 May 21, 2015

(51) Int. Cl.
*B64C 27/00* (2006.01)
*B64D 35/00* (2006.01)

(52) U.S. Cl.
CPC ............... *B64D 35/00* (2013.01); *B64C 27/001* (2013.01); *B64C 2027/002* (2013.01); *B64C 2027/004* (2013.01)

(58) Field of Classification Search
CPC ............ B64C 27/001; B64C 2027/002; B64C 2027/004; B64D 35/00; B64D 35/04; B64D 27/02; B64D 27/26; B64D 2027/262
See application file for complete search history.

(56) References Cited

U.S. PATENT DOCUMENTS

| | | | |
|---|---|---|---|
| 3,690,607 A * | 9/1972 | Mard | B64C 27/001 188/382 |
| 3,698,663 A * | 10/1972 | Balke | B64C 27/001 244/17.27 |
| 4,733,854 A | 3/1988 | Miyamoto | |
| 5,018,698 A | 5/1991 | Tobias | |
| 5,067,684 A | 11/1991 | Garnjost | |
| 5,141,202 A | 8/1992 | Tobias | |
| 5,316,240 A * | 5/1994 | Girard | B64C 27/001 188/380 |
| 5,332,203 A | 7/1994 | Gossman et al. | |
| 5,413,320 A | 5/1995 | Herbst | |
| 5,423,523 A | 6/1995 | Gossman et al. | |
| 6,009,983 A | 1/2000 | Stamps et al. | |
| 6,283,408 B1 * | 9/2001 | Ferullo | B64C 27/001 244/17.27 |
| 6,325,327 B1 * | 12/2001 | Zoppitelli | B64C 27/001 244/17.27 |
| 6,431,530 B1 | 8/2002 | Stamps et al. | |
| 7,631,835 B2 * | 12/2009 | Ferrer | B64C 27/001 244/1 N |
| 8,113,321 B2 * | 2/2012 | McGuire | B64C 27/001 188/266.3 |
| 8,328,129 B2 | 12/2012 | Smith et al. | |
| 2003/0057318 A1 * | 3/2003 | Struzik | B64C 27/001 244/17.27 |
| 2006/0151272 A1 | 7/2006 | Smith et al. | |
| 2009/0321556 A1 * | 12/2009 | Pancotti | B64C 27/001 244/17.27 |
| 2010/0090055 A1 * | 4/2010 | Smith | B64C 27/12 244/17.27 |
| 2013/0175389 A1 | 7/2013 | Griffin | |

* cited by examiner

*Primary Examiner* — Brian M O'Hara
*Assistant Examiner* — Assres H Woldemaryam
(74) *Attorney, Agent, or Firm* — Noah A. Tevis (57) ABSTRACT

A mount system for supporting a transmission in an aircraft can include a first link coupled between a structure of the aircraft and the transmission, the first link having a first axis; a second link coupled between the structure of the aircraft and the transmission, the second link having second axis; a third link coupled between the structure of the aircraft and the transmission, the third link having a third axis; and a fourth link coupled between the structure of the aircraft and the transmission, the fourth link having fourth axis. A forward focal point of the first axis and the second axis has a different waterline component compared to an aft focal point of the third axis and the fourth axis.

16 Claims, 9 Drawing Sheets

HELICOPTER TRANSMISSION MOUNT SYSTEM

BACKGROUND

1. Technical Field

The present disclosure relates to a helicopter transmission mount system.

2. Description of Related Art

Conventional transmission mount systems can utilize a plurality of leg mounts for mounting the transmission to an airframe structure, such as a roof mounted pylon. Typically, the legs can have a single focal point or have no focal point, both of which can act as a virtual center of rotation. Creating a virtual center of rotation can increase the loads from rolling or swinging of the transmission about the virtual center of rotation. Such a conventional configuration lacks cross-coupling for stiffness and vibration reduction with load paths between multiple degrees of freedom.

Conventional transmission mount systems can utilize a plurality of leg mounts for mounting the transmission to an airframe structure, such as a roof mounted pylon. However, conventional transmission mount systems lack the ability to not only attenuate vibration is certain directions, but also measure and resist certain loads, such as a torque load from a rotor mast.

There is a need for an improved helicopter transmission mount system.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the embodiments are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
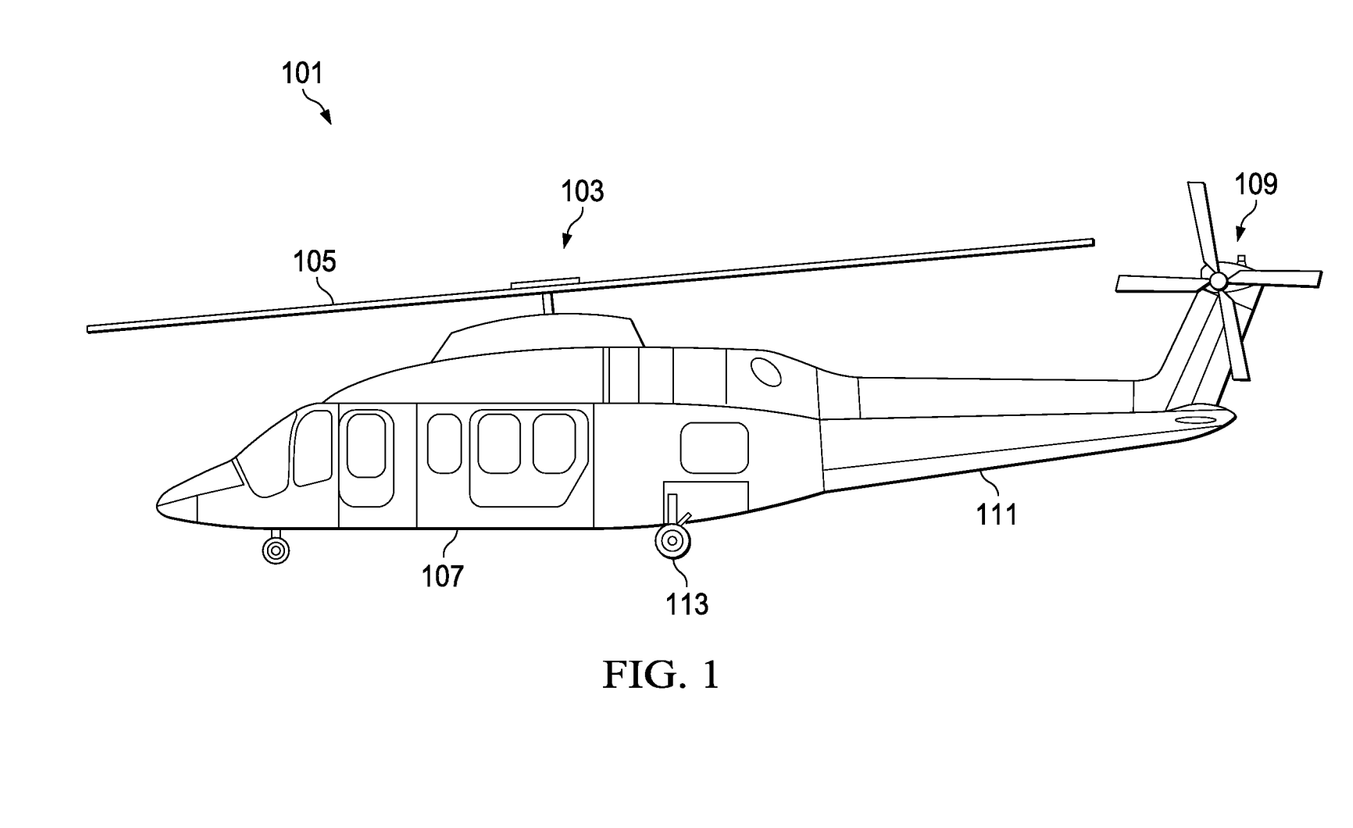
FIG. 1 is a side view of a rotorcraft, according to an example embodiment.
Figure 2:
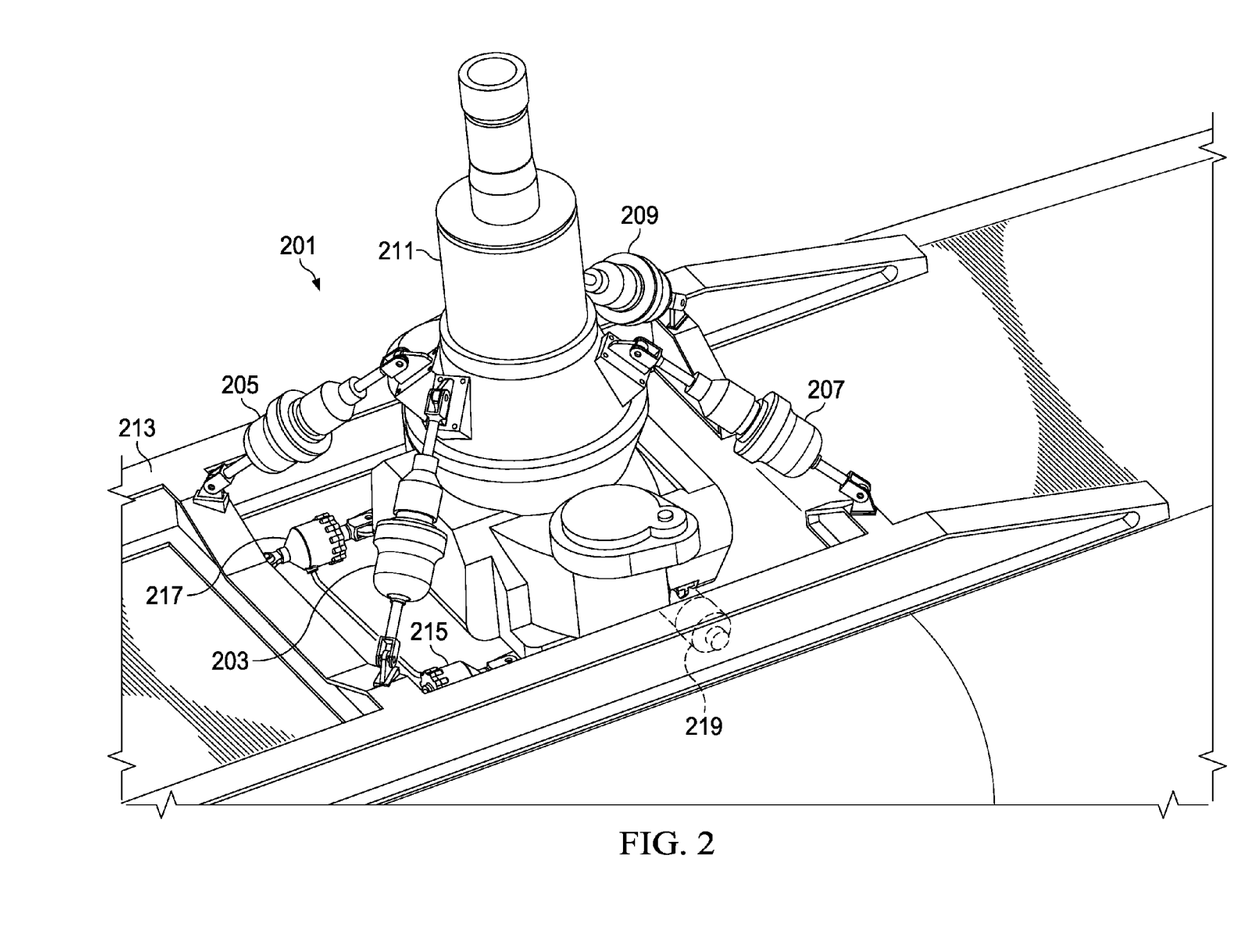
FIG. 2 is perspective view of a transmission mount system for a rotorcraft, according to an example embodiment.
Figure 3:
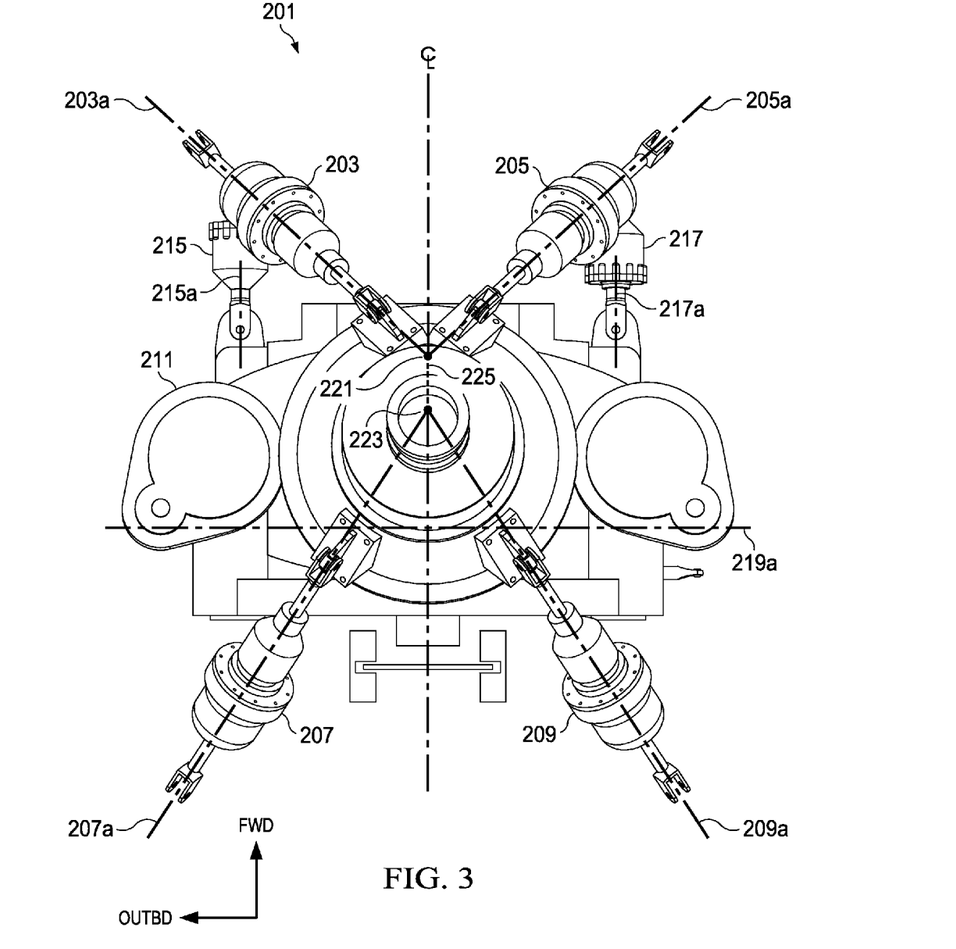
FIG. 3 is a top plan view of a transmission mount system for a rotorcraft, according to an example embodiment.
Figure 4:
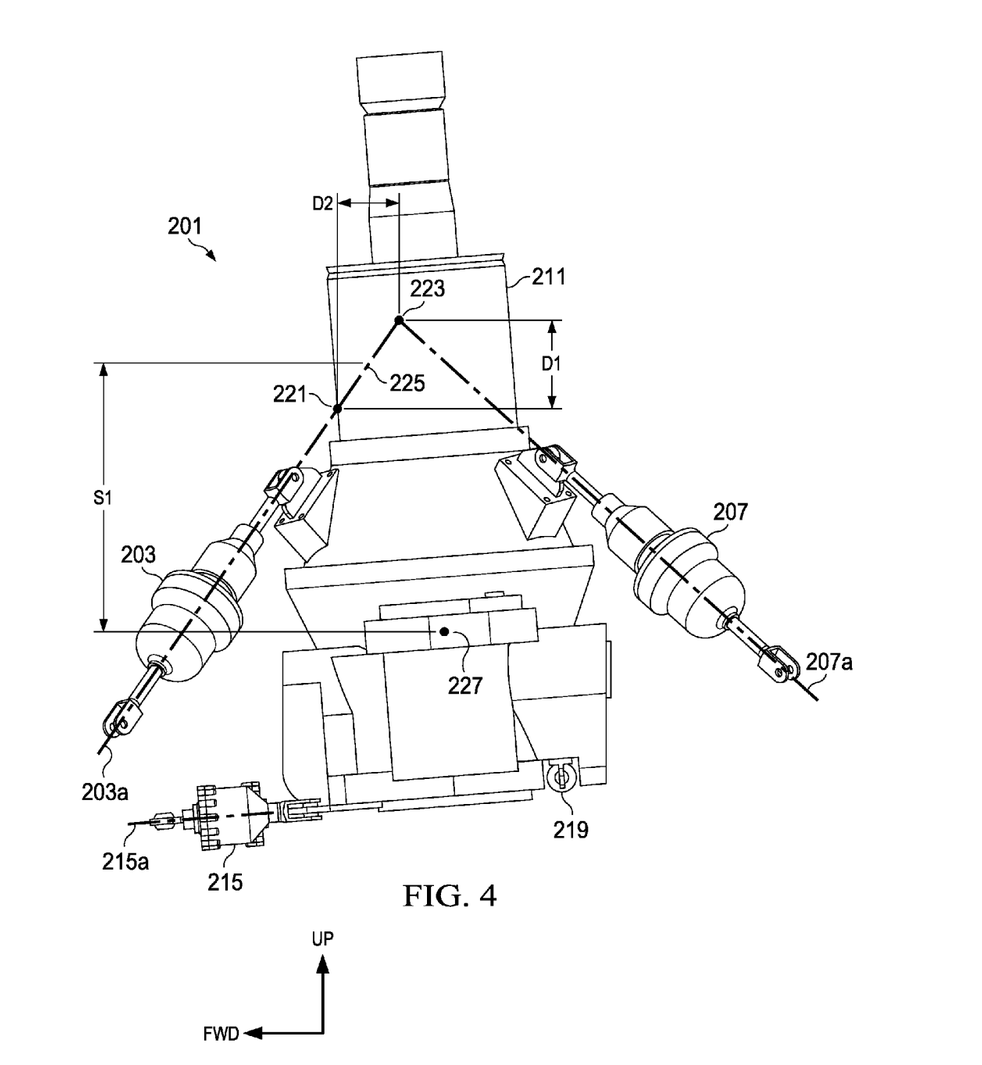
FIG. 4 is a side view of a transmission mount system for a rotorcraft, according to an example embodiment.
Figure 5:
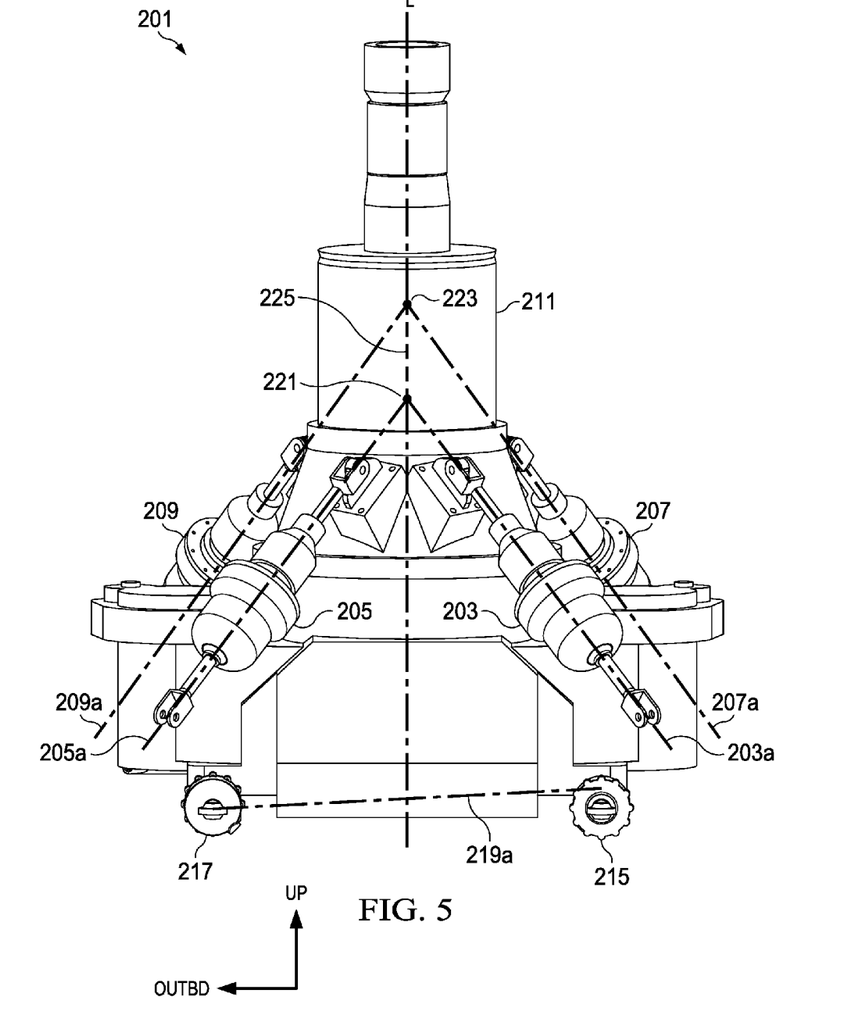
FIG. 5 is a front view of a transmission mount system for a rotorcraft, according to an example embodiment.
Figure 6:
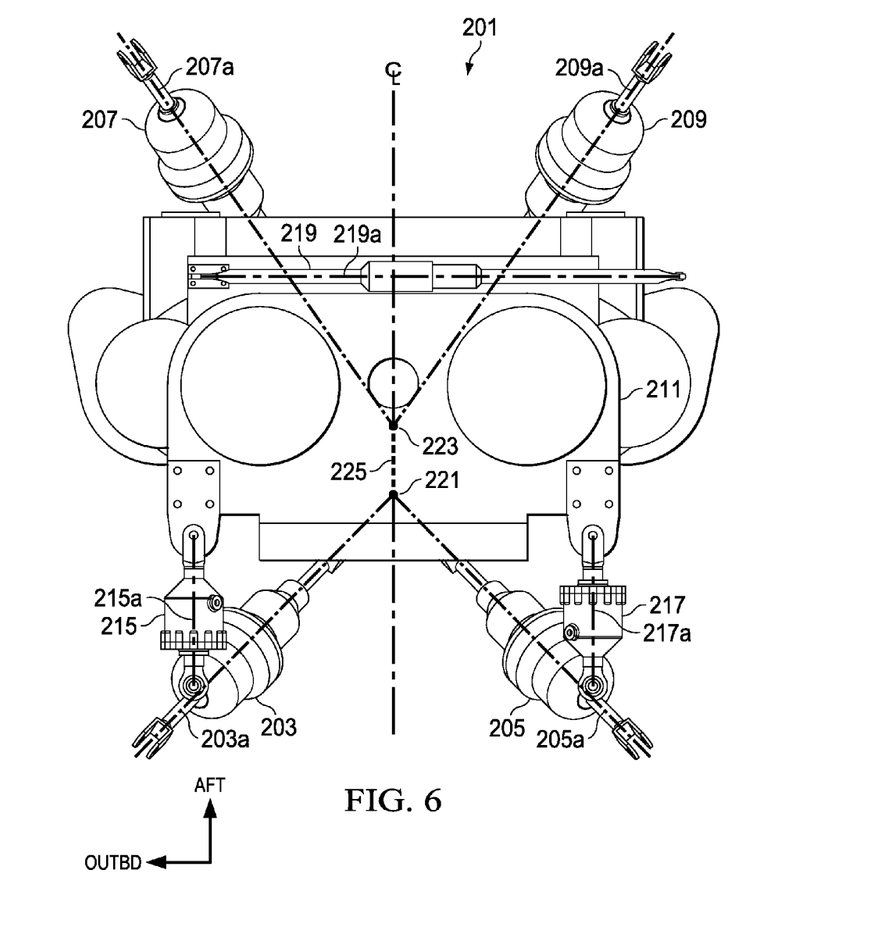
FIG. 6 is a bottom view of a transmission mount system for a rotorcraft, according to an example embodiment.
Figure 7:
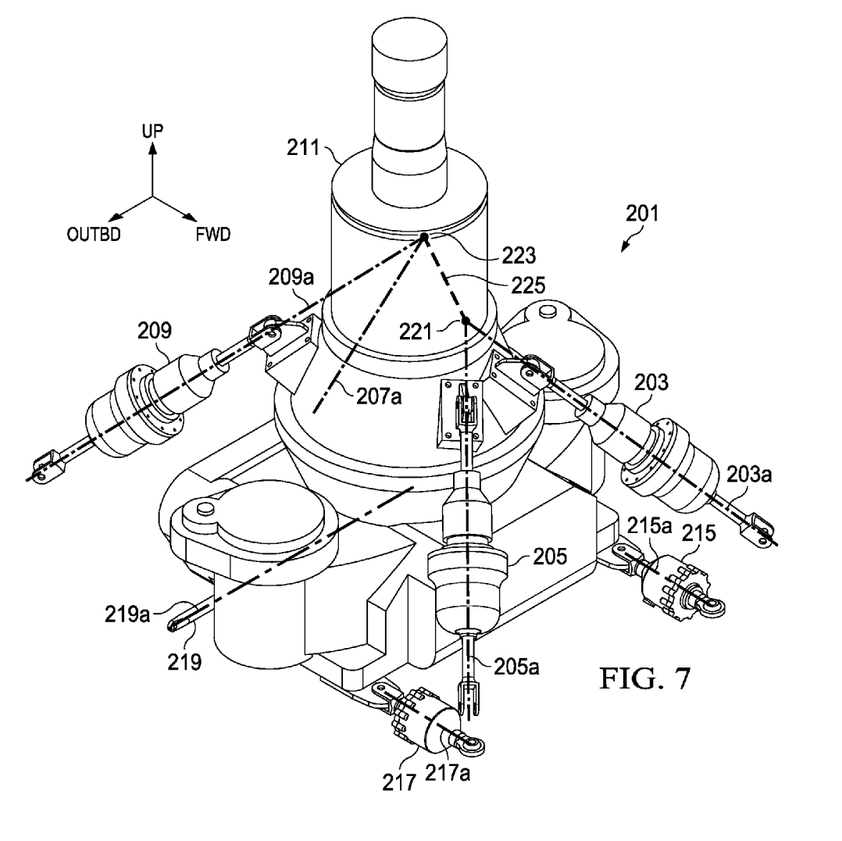
FIG. 7 is a perspective view of a transmission mount system for a rotorcraft, according to an example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be selectively controlled in order to selectively control direction, thrust, and lift of rotorcraft 101. Rotorcraft 101 further includes a fuselage 107, anti-torque system 109, and an empennage 111. Rotorcraft 101 further includes a landing gear system 113 to provide ground support for the aircraft. It should be appreciated that rotorcraft 101 is merely illustrative of a variety of aircraft that can implement the embodiments disclosed herein. Other aircraft implementations can include hybrid aircraft, tilt rotor aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices can also implement the embodiments.

Referring also to FIGS. 2-7 in the drawings, mount system 201 for supporting a transmission 211 is illustrated in further detail. Mount system 201 can include a left forward leg 203 having a central axis 203a, a right forward leg 205 having a central axis 205a, a left rear leg 207 having a central axis 207a, a right rear leg 209 having a central axis 209a. Legs 203, 205, 207, and 209 can be structurally coupled between a structural pylon assembly 213 and lug mounts on transmission 211, thereby providing the primary structural support of transmission 211. The operationally induced forward, lateral, and torsional motions can be reacted by a variety of arrangements; however, the preferred arrangement includes a left fore/aft strut 215 having a central axis 215a, a right fore/aft strut 217 having a central axis 217a, and a lateral strut 219 having a central axis 219a.

One feature of mount system 201 is that left forward leg 203 and right forward leg 205 are oriented such that axes 203a and 205a intersect at a forward focal point 221, while left rear leg 207 and right rear leg 209 are oriented such that axes 207a and 209a intersect at an aft focal point 223, the distance between forward focal point 221 and aft focal point 223 forming a virtual roll axis 225 therebetween. In the illustrated embodiment, both forward focal point 221 and aft focal point 223 lie on a centerline (e.g. zero buttline) of the rotorcraft 101.

One advantage of mount system 201 over conventional mount systems is that by locating forward focal point 221 and aft focal point 223 on different aircraft waterlines, the rolling tendency is substantially decreased. In the example embodiment, the waterline distance between forward focal point 221 and aft focal point 223 is represented by a distance D1, while the fuselage station difference between forward focal point 221 and aft focal point 223 is represented by a distance D2.

For example, transmission 211 can have a virtual swing arm S1 between a center of gravity 227 and virtual roll axis 225 with which transmission 221 will have a natural propensity to swing about. However, mount system 201 is configured such that virtual roll axis 225 is substantially inclined by orienting aft focal point 223 with a substantially higher waterline as compared to forward focal point 221, as illustrated by distance D1. The inclination of virtual roll axis 225 impedes the swinging of transmission 221 which decreases the loads associated with a swinging of transmission 211.

In the example embodiment, each end of legs 203, 205, 207, and 209 are coupled to the transmission 211 and pylon assembly 213 with spherical bearings to prevent legs 203, 205, 207, and 209 from reacting loads in unintended directions. For example, fore/aft loads and torsional loads are not reacted by legs 203, 205, 207, and 209, but rather by fore/aft struts 215 and 217. Further, lateral loads are not reacted by legs 203, 205, 207, and 209, but rather by lateral strut 219. Mounting legs 203, 205, 207, and 209 with spherical bearings ensures that each leg 203, 205, 207, and 209 will only react loads along its respective axis 203a, 205a, 207a, and 209a. Further, prevention of load reaction outside of axis 203a, 205a, 207a, and 209a in combination with the freedom to adjust the waterline and fuselage station of forward focal point 221 and aft focal point 223 provides tunability to optimize vibration reduction and reduce rolling tendency of transmission about virtual roll axis 225.

It should be appreciated that if front legs 203 and 205, and aft legs 207 and 209 were oriented so as to not have focal points, then mount system 201 would be very difficult to properly tune for vibration attenuation and would likely require additional unique support structures, thereby increasing weight and vibration.

In one example embodiment, legs 203, 205, 207, and 209 are "soft" (i.e. not rigid) legs in that each leg 203, 205, 207, and 209 can include internal components, such as fluid, orifices, springs, elastomeric members, and the like, to isolate and/or dampen vibrations between the transmission 211 and the airframe of the aircraft. Similarly, struts 215, 217, and 219 can include can include internal components, such as fluid, orifices, springs, elastomeric members, and the like, to isolate and/or dampen vibrations between the transmission 211 and the airframe of the aircraft. In one embodiment, legs 203, 205, 207, and 209 can be liquid inertia vibration elimination units described in U.S. Pat. No. 6,431,530, issued on 13 Aug. 2002, which is hereby incorporated by reference, or described in U.S. Pat. No. 6,009,983, issued on 4 Jan. 2000, which is also hereby incorporated by reference.

Figure 8:
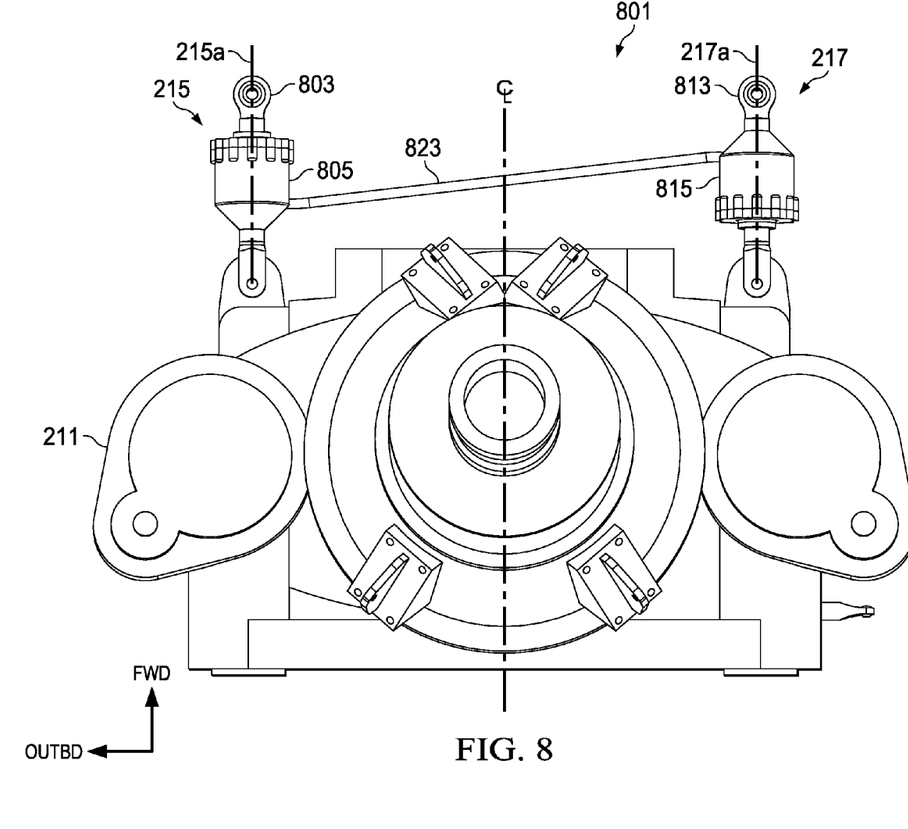
FIG. 8 is a top plan view of a restraint system for a rotorcraft, according to an example embodiment.
Figure 9:
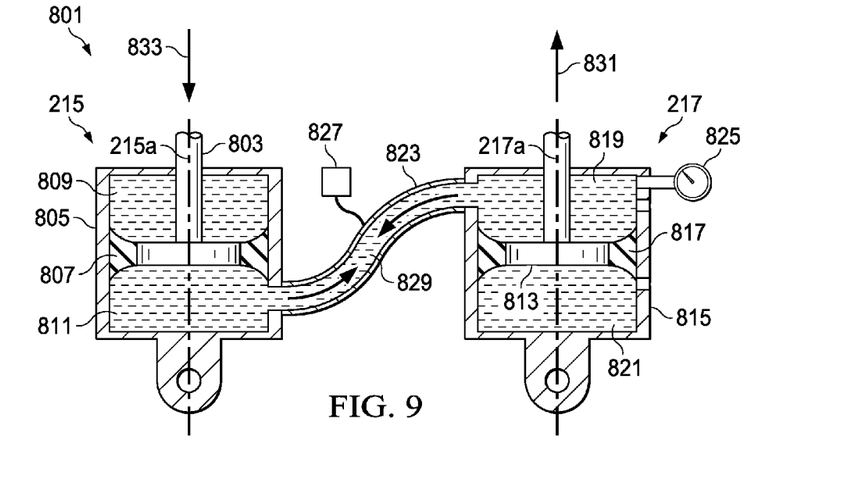
FIG. 9 is a sectional schematic view of a restraint system for a rotorcraft, according to an example embodiment.
Figure 10:
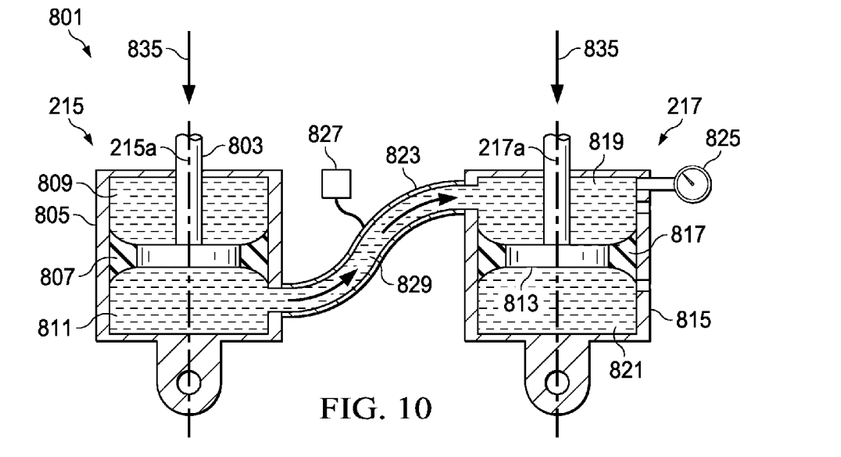
FIG. 10 is a sectional schematic view of a restraint system for a rotorcraft, according to an example embodiment.

Referring now also to FIGS. 8-10, an example embodiment of a restraint system 801 is illustrated in further detail. Restraint system 801 is an embodiment of left fore/aft strut 215 and right fore/aft strut 217 that collectively provides not only torque restraint, but also torque measurement and fore/aft vibration isolation.

Restraint system 801 is particularly well suited to accompany a primary transmission mount system, such as legs 203, 205, 207, 209 that are configured to not react fore/aft loads and torque loads, as discussed further herein. However, it should be appreciated that restraint system 801 can accompany a transmission mount system having any plurality of leg members oriented in a variety of different orientations.

Restraint system 801 includes a left fore/aft strut 215 having a piston 803 resiliently coupled to a housing 805 with an elastomeric member 807. Piston 803 and elastomeric member 807 divide housing 805 into a first chamber 809 and a second chamber 811. Similarly, restraint system 801 includes a right fore/aft strut 217 having a piston 813 resiliently coupled to a housing 815 with an elastomeric member 817. Piston 813 and elastomeric member 817 divide housing 815 into a first chamber 819 and a second chamber 821.

Second chamber 811, second chamber 821, and a fluid line 823 are filled with a fluid 829. First chamber 809 and first chamber 819 don't require fluid 829 and thus can be open or vented rather than being enclosed chambers. For example, first chamber 809 and first chamber 819 can be filled with air, or open/vented to atmosphere.

During operation, restraint system 801 is configured to resist/react torque loads, measure torque loads, as well as attenuate vibration in the fore/aft direction. Referring in particular to FIG. 9, restraint system 801 is illustrated with regard to the reaction and measurement of torque loads. During operation of a rotorcraft, such as rotorcraft 101, torque is carried in the rotor mast and into transmission 211. Various maneuvers and operations of the rotorcraft 101 can cause the amount of torque to vary significantly. For example, an increase in rotor blade pitch during a hover maneuver can increase the amount of torque load upon transmission 211. One of ordinarily skill in the art would appreciate that the tail rotor 109 acts to provide anti-torque to counter the torque reacted by transmission 211 and provide for yaw control.

As discussed further herein, legs 203, 205, 207, and 209 are configured to not react torque, thus the torque experienced by transmission 211 is reacted by fore/aft struts 217 and 219. Preferably, fore/aft struts 217 and 219 are mounted with spherical bearings so that the torque load is substantially realized as a forward directional load 831 along axis 217a and aft direction load 833 along axis 215a. Forward directional load 831 attempts to pull piston 813 forward, but the equal and opposite aft directional load 833 attempts to push piston 803, thereby creating an fluid lock since the fluid 829 in second chamber 811 is in fluid communication with the fluid 829 in first fluid chamber 819 via fluid line 823. As such, the torque is restrained with a stiffness that is dependent upon the bulk modulus (or stiffness) of the implementation specific fluid 829. Furthermore, the amount of torque reacted by fore/aft struts 217 and 219 can be measured by a pressure sensor 825. Pressure sensor 825 can be in communication with one or more processors for analysis. In another embodiment, pressure sensor 825 is in communication with a visual gauge in the cockpit of the aircraft so that the operator can evaluate the torque in real time.

It should be appreciated that the direction of forward directional load 831 and aft direction load 833 can be directionally reversed in the case of a rotorcraft having a main rotor hub that turns in the opposite direction from that of the example embodiment.

Referring now also to FIG. 10, restraint system 801 is illustrated with regard to the attenuation of oscillatory vibration in the fore/aft direction. Oscillatory vibration loads can be generated during operation, some of the oscillatory vibrations can have a fore/aft component. In FIG. 10, an oscillatory load left untreated would be realized as a vibration in the aircraft. For illustrative purposes, the oscillatory load is schematically shown in an aft direction by direction arrows 835; however, it should be appreciated that the load oscillates fore/aft at a certain frequency. When the load is in the aft direction, shown by arrows 835, pistons 803 and 813 are pushed aft, which decreases the volume of fluid 829 in second chamber 811 and increases the volume of fluid 829 in first chamber 819, thereby creating a net shift in fluid in a forward direction. The axial shift in fluid 829 acts to cancel the load input in that the mass of the fluid 829 shift creates an inertial mass cancellation of the input. Since the fore/aft load oscillates fore/aft at a certain frequency, the restraint system 801 employs the principle that the acceleration of an oscillating mass is 180° out of phase with its displacement.

Utilizing a fluid 829 with high density and low viscosity provides the desired inertial characteristics, combined with a hydraulic advantage resulting from a piston arrangement, so as to harness the out-of-phase acceleration to generate counter balancing forces to attenuate or cancel the vibration. During operation, elastomeric members 807 and 817 act as spring members. The fluid line 823 acts as an inertia track and can be tuned so that the restraint system 801 attenuates vibration at a desired frequency. Further, if the fore/aft oscillatory load varies, then an optional active pumper 827 can be utilized to actively adjust the isolation frequency by imparting pumping fluid 829 at a frequency that adjusts the isolation frequency.

A vibration isolator that operates under a similar principle is described in U.S. Patent Application Publication 2013/0175389, filed on 10 Jan. 2012, which is hereby incorporated by reference.

One advantage of restraint system 801 is that that it uniquely not only attenuates vibration in certain directions, but also measures and resists certain loads, such as a torque load from a rotor mast.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A mount system for supporting a transmission in an aircraft, the mount system comprising:
 a first link coupled between a structure of the aircraft and the transmission, the first link having a first axis;
 a second link coupled between the structure of the aircraft and the transmission, the second link having second axis;
 a third link coupled between the structure of the aircraft and the transmission, the third link having a third axis;
 a fourth link coupled between the structure of the aircraft and the transmission, the fourth link having fourth axis;
 wherein the first link and the second link are oriented such that the first axis and the second axis intersect at a forward focal point;
 wherein the third link and the fourth link are oriented such that the third axis and the fourth axis intersect at an aft focal point;
 wherein the forward focal point has a different waterline location compared to the aft focal point;
 wherein the first link and the second link are coupled to the transmission at different locations;
 wherein the third link and the fourth link are coupled to the transmission at different locations; and
 wherein the forward focal point and the aft focal point are located within an interior portion of the transmission so that a virtual roll axis extending between the forward focal point and the aft focal point passes through a portion of the transmission.

2. The mount system according to claim 1, wherein the forward focal point has a lower waterline location compared to the aft focal point.

3. The mount system according to claim 1, wherein the forward focal point lies on a zero buttline plane of the aircraft.

4. The mount system according to claim 1, wherein the aft focal point lies on a zero buttline plane of the aircraft.

5. The mount system according to claim 1, wherein the first link, the second link, the third link, and the fourth link are coupled to the transmission with a plurality of spherical bearings.

6. The mount system according to claim 1, wherein the first link, the second link, the third link, and the fourth link are coupled to the airframe with a plurality of spherical bearings.

7. The mount system according to claim 1, wherein the structure of the aircraft is a pylon assembly.

8. The mount system according to claim 1, wherein the first link, the second link, the third link, and the fourth link having one or more moving parts for vibration attenuation.

9. The mount system according to claim 1, wherein the first link, the second link, the third link, and the fourth link are configured such that the overall length can change during vibration attenuation.

10. The mount system according to claim 1, further comprising:
 a fifth link coupled between the structure of the aircraft and the transmission, the fifth link having a fifth axis that is approximately parallel with a longitudinal axis of the aircraft;
 a sixth link coupled between the structure of the aircraft and the transmission, the sixth link having a sixth axis that is approximately parallel with the longitudinal axis of the aircraft.

11. The mount system according to claim 1, further comprising:
 a seventh link coupled between the structure of the aircraft and the transmission, the seventh link having a seventh axis that is approximately parallel with a lateral axis of the aircraft.

12. The mount system according to claim 1, wherein the aircraft is a helicopter.

13. The mount system according to claim 1, wherein the forward focal point has a fuselage station location that is forward to a fuselage station of the aft focal point by a longitudinal distance, and wherein a waterline location of the forward focal point is lower than a waterline location of the aft focal point by a vertical distance.

14. The mount system according to claim 13, wherein the vertical distance is greater than the longitudinal distance.

15. The mount system according to claim 1, wherein the forward focal point is separated from the aft focal point by a longitudinal distance as measured along a centerline longitudinal axis of the aircraft, and wherein the forward focal point is separated from the aft focal point by a vertical distance as measured along a vertical axis of the aircraft.

16. The mount system according to claim 15, wherein the vertical distance is greater than the longitudinal distance.

* * * * *